United States Patent
Choi

(10) Patent No.: US 7,520,258 B2
(45) Date of Patent: Apr. 21, 2009

(54) AIR CLEANER INTAKE DUCT

(75) Inventor: Wonseop Choi, Gunpo (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 11/950,634

(22) Filed: Dec. 5, 2007

(65) Prior Publication Data

US 2009/0031980 A1 Feb. 5, 2009

(30) Foreign Application Priority Data

Jul. 30, 2007 (KR) ...................... 10-2007-0076496

(51) Int. Cl.
*F02M 35/12* (2006.01)
*F02B 77/04* (2006.01)

(52) U.S. Cl. .............................. 123/198 E; 123/184.56; 123/184.57; 123/184.61

(58) Field of Classification Search ............ 123/184.21, 123/184.53, 184.57, 590, 198 E, 184.56, 123/184.61

See application file for complete search history.

(56) References Cited

U.S. PATENT DOCUMENTS

| | | | | |
|---|---|---|---|---|
| 4,713,097 A | * | 12/1987 | Grawi et al. .................. 96/380 |
| 4,790,864 A | * | 12/1988 | Kostun ......................... 96/388 |
| 4,826,517 A | * | 5/1989 | Norman ......................... 55/418 |
| 5,059,221 A | * | 10/1991 | McWilliam .................. 96/380 |
| 5,806,480 A | * | 9/1998 | Maeda et al. .......... 123/184.57 |
| 5,947,072 A | * | 9/1999 | Loy et al. .............. 123/184.56 |
| 6,148,782 A | * | 11/2000 | Fuesser .................. 123/184.53 |
| 6,347,609 B1 | * | 2/2002 | Bloomer ................ 123/184.57 |
| 6,409,784 B1 | * | 6/2002 | Wehr ......................... 55/385.3 |
| 6,463,901 B1 | * | 10/2002 | Cuddihee et al. ....... 123/184.21 |
| 6,553,955 B1 | * | 4/2003 | Hada et al. ............. 123/184.53 |
| 6,899,081 B2 | * | 5/2005 | Bielicki et al. .............. 123/402 |
| 7,093,589 B2 | * | 8/2006 | Sorersen et al. .......... 123/559.1 |
| 2007/0028884 A1 | * | 2/2007 | Atsumi .................. 123/184.53 |
| 2007/0278034 A1 | * | 12/2007 | Yamaura et al. ............ 181/229 |

* cited by examiner

*Primary Examiner*—Hai H Huynh
(74) *Attorney, Agent, or Firm*—Morgan, Lewis & Bockius LLP

(57) ABSTRACT

An air cleaner intake duct includes a first pipe for receiving intake air and a second pipe that encloses the first pipe. A space is defined between the first pipe and the second pipe. The duct also includes a diffuser connected to the first pipe and configured to be connected to an air cleaner.

8 Claims, 2 Drawing Sheets

AIR CLEANER INTAKE DUCT

CROSS-REFERENCE TO RELATED APPLICATION

This application claims priority to, and the benefit of, Korean Patent Application No. 10-2007-0076496, filed in the Korean Intellectual Property Office on Jul. 30, 2007, the entire contents of which are incorporated herein by reference.

BACKGROUND OF THE INVENTION (a) Field of the Invention

The present invention relates to an air cleaner intake duct.

(b) Description of the Related Art

A vehicle engine runs on a mixture of fuel and air. The air typically flows through an air cleaner intake duct into an air cleaner, where it is cleaned, and then mixed with the fuel.

A typical air cleaner intake duct includes an acoustic duct made of a non-woven fabric material, and a polyurethane duct that surrounds the acoustic duct without a space therebetween. The duct also includes an insulator for preventing vibration, a shield duct for insulating from heat, a diffuser, and an attachment strap.

The non-woven fabric material typically used for the acoustic duct may not provide enough intake pressure. In addition, the large number of components yields high manufacturing costs.

The above information disclosed in this Background section is only for enhancement of understanding of the background of the invention and therefore it may contain information that does not form the prior art that is already known in this country to a person of ordinary skill in the art.

SUMMARY OF THE INVENTION

An air cleaner intake duct includes a first pipe for receiving intake air and a second pipe that encloses the first pipe. A space is defined between the first pipe and the second pipe. The duct also includes a diffuser connected to the first pipe and configured to be connected to an air cleaner.

A connecting portion may be defined between the first pipe and the diffuser, and the second pipe may be connected to the connecting portion.

The second pipe may include an inlet portion that includes a first, proximal portion and a second, distal portion. The first portion may have a diameter that is smaller than a diameter of the second pipe, and the second portion may have a diameter that is greater than the diameter of the first portion.

A smallest portion of the inlet portion may have a diameter equal to that of the first pipe. The smallest portion of the inlet portion may be distal to the first pipe.

A noise-reducing hole may be provided in the connecting portion.

The diameter of the diffuser may be larger than the diameter of the first pipe.

The first pipe, the connecting portion, and the diffuser may be integrally formed of polypropylene.

DETAILED DESCRIPTION OF PREFERRED EMBODIMENTS

Figure 1:
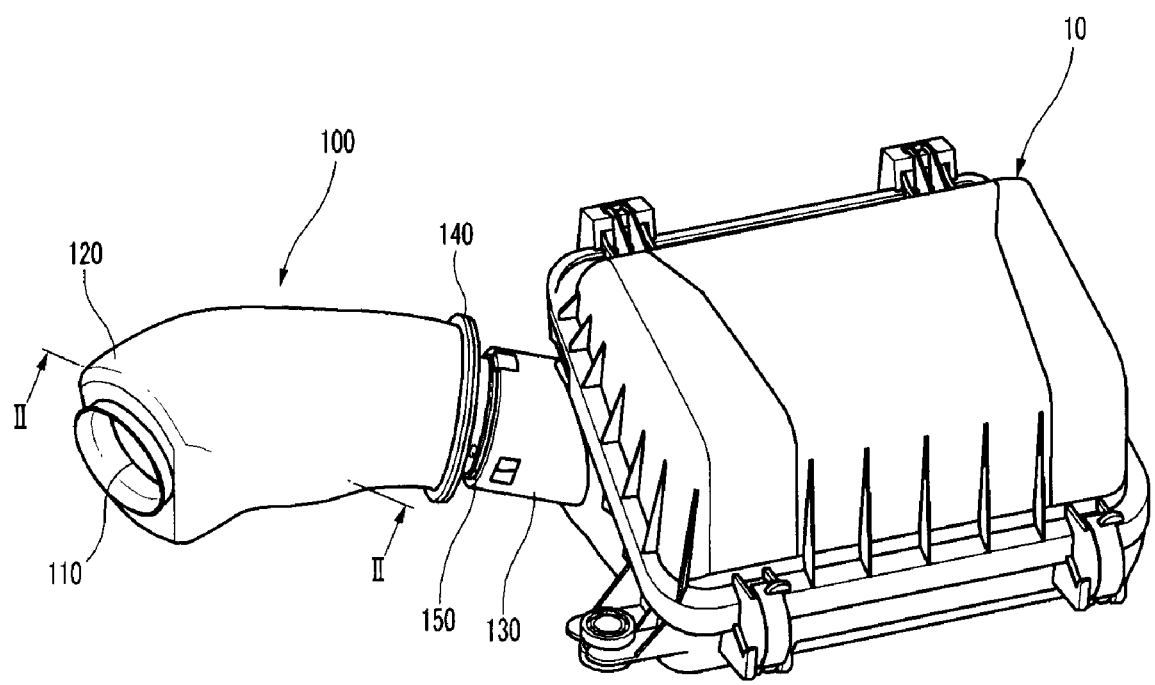
FIG. 1 is a perspective view of an air cleaner intake duct according to an exemplary embodiment of the present invention.

Referring to the FIGs, an air cleaner intake duct 100 according to an exemplary embodiment of the present invention is connected to an air cleaner 10.

The air cleaner intake duct 100 includes a first pipe 110 for receiving intake air, and a second pipe 120 that encloses the first pipe 110. A space is defined between the first pipe 110 and second pipe 120.

A diffuser 130 is disposed between the first pipe 110 and the air cleaner 10.

A connecting portion 140 is disposed between the first pipe 110 and the diffuser 130, and the connecting portion 140 is connected with the second pipe 120.

Figure 2:
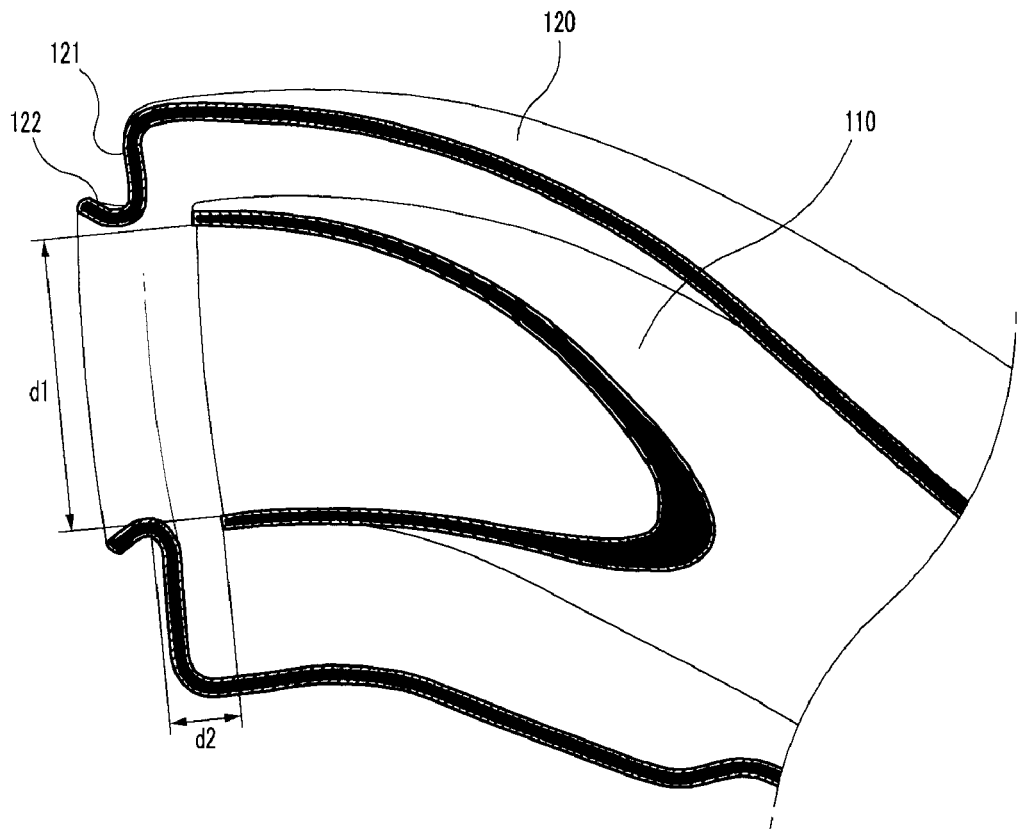
FIG. 2 is a partial cross-sectional view taken along line II-II of FIG. 1.
Figure 3:
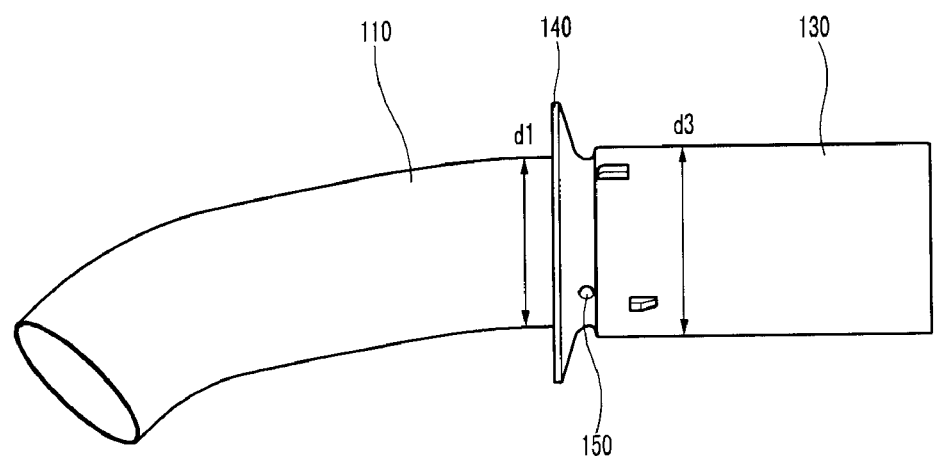
FIG. 3 is a side view of a first pipe and a diffuser of the duct of FIG. 1.

Referring to FIG. 2, the second pipe 120 includes an inlet portion including a first, larger portion 121 and a second, smaller portion 122.

Because of the shape of the first portion 121 and the second portion 122, intake air smoothly flows therein, and intake back pressure can be reduced. Also, noise can be reduced.

The inlet portion has a diameter at its smallest point that is about equal to the diameter of the first pipe 110, d1. Generally, noise reduction is inversely proportional to intake pressure. An optimal relationship of noise reduction and intake pressure can be expected when the smallest diameter of the inlet portion is equal to the diameter of the first pipe 110.

It has been found experimentally that the optimal diameter is about 48.5 mm, but the optimal diameter may of course vary with size or kind of engine and so on.

The smallest diameter portion of the second pipe 122 is distanced from the end of the first pipe 110 by a distance d2.

If d2≈8 mm, noise at 100 Hz can be reduced effectively. The optimal size of the gap can be determined by experiment, and may vary according to the size or kind of an engine or ranges of noise.

At least one hole 150 is formed in the connecting portion 140 for reducing noise. The hole 150 may act as a resonator. The size, shape, number, and so on of the hole 150 can be determined by experiments, and may vary by size, kind, and so on of an engine.

The diameter of the diffuser 130 is larger than the diameter of the first pipe 110, so that noise reduction and intake pressure can be maintained.

The first pipe 110, the connecting portion 140, and the diffuser 130 may be integrally formed, reducing the number of elements and thus the manufacturing cost, as well as the weight of the air cleaner intake duct 110.

The air cleaner intake duct 110 can be made of polypropylene. Its smooth surface thus prevents intake pressure reduction.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An air cleaner intake duct comprising:
   a first pipe for receiving intake air;
   a second pipe that encloses the first pipe, wherein a space is defined between the first pipe and the second pipe, wherein the second pipe includes an inlet portion having a first, proximal portion and a second, distal portion, wherein the first portion has a diameter that is smaller than a diameter of the second pipe, and the second portion has a diameter that is greater than the diameter of the first portion; and a diffuser connected to the first pipe and configured to be connected to an air cleaner.

2. The air cleaner intake duct of claim 1, wherein a connecting portion is defined between the first pipe and the diffuser, and the second pipe is connected to the connecting portion.

3. The air cleaner intake duct of claim 2, further comprising a noise-reducing hole in the connecting portion.

4. The air cleaner intake duct of claim 1, wherein a smallest portion of the inlet portion has a diameter substantially equal to a diameter of the first pipe.

5. The air cleaner intake duct of claim 4, wherein the smallest portion is distal to the first pipe.

6. The air cleaner intake duct of claim 1, wherein a diameter of the diffuser is larger than a diameter of the first pipe.

7. The air cleaner intake duct of claim 1, wherein the first pipe, the connecting portion, and the diffuser are integrally formed.

8. The air cleaner intake duct of claim 1, wherein the first pipe, the connecting portion, and the diffuser comprise polypropylene.

* * * * *